(12) United States Patent
Kim et al.

(10) Patent No.: US 8,538,134 B2
(45) Date of Patent: Sep. 17, 2013

(54) METHOD AND APPARATUS FOR RECEIVING AND GENERATING IMAGE DATA STREAM INCLUDING PARAMETERS FOR DISPLAYING LOCAL THREE DIMENSIONAL IMAGE

(75) Inventors: Yong-tae Kim, Seoul (KR); Jae-seung Kim, Yongin-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1205 days.

(21) Appl. No.: 12/146,942

(22) Filed: Jun. 26, 2008

(65) Prior Publication Data
US 2009/0092335 A1 Apr. 9, 2009

Related U.S. Application Data

(60) Provisional application No. 60/977,479, filed on Oct. 4, 2007.

(30) Foreign Application Priority Data

Nov. 27, 2007 (KR) ........................ 10-2007-0121396

(51) Int. Cl.
*G06K 9/00* (2006.01)
(52) U.S. Cl.
USPC ............ 382/154; 382/103; 382/276; 382/285

(58) Field of Classification Search
USPC .................................. 382/154, 103, 276, 285
See application file for complete search history.

(56) References Cited

U.S. PATENT DOCUMENTS

2008/0252639 A1* 10/2008 Ijzerman et al. .............. 345/419

FOREIGN PATENT DOCUMENTS

EP 1524859 A2 * 4/2005
JP 2005026800 A * 1/2005

OTHER PUBLICATIONS

The English version of JP2005-026800.*

* cited by examiner

*Primary Examiner* — Kim Vu
*Assistant Examiner* — Ruiping Li
(74) *Attorney, Agent, or Firm* — Sughrue Mion, PLLC

(57) ABSTRACT

Provided are a method and apparatus for receiving and generating an image data stream including a three dimensional (3D) image. The method of receiving an image data stream includes receiving an image data stream including at least one of two dimensional (2D) and 3D image data periods; extracting local 3D image parameters, which are parameters of each image data period, from the image data stream; and restoring at least one of 2D and 3D images by using the local 3D image parameters. In the method, each 3D image is composed of at least one of a base image and an additional image, and the local 3D image parameters include stereoscopic arrangement order information representing an arrangement order of the base image and additional image of the 3D image.

30 Claims, 12 Drawing Sheets

FIG. 5

| | |
|---|---|
| 500 | Local3D( ) { |
| 510 | number_of_interval |
| 520 | for( i = 0; i < number_of_3D_period; i++ ){ |
| 530 | start_position[i] |
| 540 | end_position[i] |
| 550 | stereo_file_format[i] |
| 560 | composition_width[i] |
| 570 | composition_height[i] |
| 580 | LR_First[i] |
| | } |

FIG. 6A

| StereoScopic Composition Type | Identification |
|---|---|
| 0 | Side by side format |
| 1 | Top and bottom format |
| 2 | Vertical line interleaved format |
| 3 | Horizontal line interleaved format |
| 4 | Frame sequential format |
| 5 | Field sequential format |
| 6 | Monoscopic left image |
| 7 | Monoscopic right image |
| 8~255 | User private |

FIG. 6B

| identification | LR_first = 0 | | LR_first = 1 | |
| --- | --- | --- | --- | --- |
| | Left view | Right View | Left view | Right view |
| Vertical line interleaved format (Parallax barrier format) | Odd line | Even line | Even line | Odd line |
| Horizontal line interleaved format | Odd line | Even line | Even line | Odd line |
| Top-down format | Upper side | Lower side | Lower side | Upper side |
| Side-by-side format | Left side | Right side | Right side | Left side |
| Field sequential format | Odd field | Even field | Even field | Odd field |
| Frame sequential format | Odd frame | Even frame | Even Frame | Even frame |
| Block-interleaved format | Odd number of MB | Even number of MB | Even number of MB | Odd number of MB |
| Two ES | Main media | Sub media | Sub media | Main media |

| 810 | ftyp | | | file type and compatibility major_brand = "ssav" |
|---|---|---|---|---|
| 820 | moov | | | container for all the metadata of timed resources |
| 860 | | trak | | container for an individual track or stream indicate Main AV data or auxiliary data |
| 870 | | ... | | ... |
| 830 | mdat | | | media data container meta |
| 840 | meta | | | Metadata |
| 850 | | sinf | | Stereoscopic information |

FIG. 9

```
Box type : 'sinf'
Container : Meta box ('meta')
Mandatory : No
Quantity : Zero or one Syntax
aligne(8) class StereoscopicInfo extends FullBox('sinf',version=0.0) {
         unsigned int(32)      num_of_interval;
910 ──── for(i=0;i<num_of_interval;i++){
920 ────   unsigned int(16) ES_ID;
930 ────   unsigned int(32) end_position[i];
           unsigned int(8) stereo_file_format[i];
940 ────   if(stereo_file_format[i]<6){
950 ────     unsigned int(1) LR_First[i];
960 ────     if(stereo_file_format[i]<2){
970 ────       unsigned int(16) composition_width[i];
               unsigned int(16) composition_height[i];
             }
           }
         }
}
```

FIG. 10

```
Syntax
aligne(8) class StereoscopicInfo extends FullBox('sinf',version=0.0) {
        unsigned int(32)      num_of_interval;
        unsigned int(32)      base_offsetES1;
        unsigned int(32)      base_offsetES2;
    for(i=0;i<num_of_interval;i++){
        unsigned int(16) ES_ID;
        unsigned int(32) intervaLlength;
        unsigned int(8) stereo_file_format[i];
        if(stereo_file_format[i]<6){
            unsigned int(1) LR_First[i];
            if(stereo_file_format[i]<2){
                unsigned int(16) composition_width[i];
                unsigned int(16) composition_height[i];
            }
        }
    }
}
```

1110
```
aligne(8) class ItemLocationBox extends FullBox ('iloc',version=0.0) {
    ...
    for(i=0;i<item_count;i++){
        unsigned int(16) item_ID;           (=ES_ID)
        unsigned int(base_offset_size*8) base_offset;
        unsigned int(16) extent_count;
        for(j=0;j<extent_count;j++){
            unsigned int(offset_size*8) extent_offset;
            unsigned int(length_size*8) extent_length;}  (=interval_length)
    }}
```

1120
```
aligne(8) class ItemLocationBox extends FullBox ('sinf',version=0.0){
    unsigned int(32)    num_of_interval;
    for(i=0;i<num_of_interval;i++){
        unsigned int(8)    stereo_file_format[i];
        if(stereo_file_format[i]<6){
            unsigned int(1) LR_First[i];
            if(stereo_file_format[i]<2){
                unsigned int(16) composition_width[i];
                unsigned int(16) composition_height[i];}
    }}
```

FIG. 12A

```
Syntax
aligne(8) class StereoscopicInfo extends FullBox('sinf', version=0.0) {
        unsigned int(32)        num_of_interval;
        unsigned int(32)        base_offsetES1;
        unsigned int(32)        base_offsetES2;                 /1210
        for(i=0;i<num_of_interval;i++){
                unsigned int(16) ES_ID;
                unsigned int(32) interval_length;
                unsigned int(8) stereo_file_format[i];
                unsigned int(1) LR_First[i];
                unsigned int(16) composition_width[i];
                unsigned int(16) composition_height[i];
        }
}
```

FIG. 12B

```
Syntax
aligne(8) class StereoscopicInfo extends FullBox('sinf', version=0.0) {
        unsigned int(32)    num_of_interval;
        unsigned int(32)    base_offsetES1;
        unsigned int(32)    base_offsetES2;
        for(i=0;i<num_of_interval;i++){
                unsigned int(16) ES_ID;
                unsigned int(32) interval_length;}
        unsigned int(8) stereo_file_format;
        unsigned int(1) LR_First;                            ⎫
        unsigned int(16) composition_width;                  ⎬ —1220
        unsigned int(16) composition_height;                 ⎭
}
```

METHOD AND APPARATUS FOR RECEIVING AND GENERATING IMAGE DATA STREAM INCLUDING PARAMETERS FOR DISPLAYING LOCAL THREE DIMENSIONAL IMAGE

CROSS-REFERENCE TO RELATED PATENT APPLICATION

This application claims the benefit of U.S. Provisional Patent Application No. 60/977,479, filed on Oct. 4, 2007, in the U.S. Patent and Trademark Office, and the benefit of Korean Patent Application No. 10-2007-0121396, filed on Nov. 27, 2007, in the Korean Intellectual Property Office, the disclosures of which are incorporated herein in their entirety by reference.

BACKGROUND OF THE INVENTION

1. Field of the Invention

The present invention relates to a method and apparatus for receiving and generating an image data stream including a three dimensional (3D) image, and more particularly, to a method and apparatus for extracting/recording parameters of a 3D image data period from/to an image data stream including the 3D image data period.

2. Description of the Related Art

Although interest in three dimensional (3D) images has increased, a large number of restrictions exist in relation to the generation of whole image contents into 3D images. Furthermore, visual fatigue may be caused while viewing the 3D images, and the 3D images may not be easily generated or transmitted.

In order to solve these problems, a local 3D image in which 3D image data is partially included in two dimensional (2D) image data is suggested. 2D image data is provided in order to two-dimensionally display image contents in a whole display period of the image contents, and 3D image data is provided in order to three-dimensionally display the image contents in one or more display periods of the image contents.

A currently suggested storage format of a 3D image uses one or two elementary streams (ESs).

FIG. 1A is a diagram illustrating an example of a method of implementing a local 3D image based on a 2D image.

Referring to FIG. 1A, the local 3D image is represented by using two ESs such as an ES 120 in which only 2D image data is recorded and an ES 110 in which 3D image data is recorded in partial periods 112 and 114.

FIG. 1B is a diagram illustrating another example of a method of implementing a local 3D image based on a 2D image.

Referring to FIG. 1B, 2D image data is recorded in one ES 130 and 3D image data is recorded in partial periods 132 and 134 to be three-dimensionally displayed.

According to the conventional methods illustrated in FIGS. 1A and 1B, only image data period position information for representing local 3D image data is transmitted and detailed information for displaying the local 3D image data is not transmitted.

SUMMARY OF THE INVENTION

The present invention provides a method and apparatus for efficiently displaying a local three dimensional (3D) image from a received image data stream including two dimensional (2D) and 3D images by extracting image data period position information and other various pieces of information on a 3D image that is formed by compositing a base image and an additional image.

The present invention also provides a method and apparatus for generating an image data stream including 2D and 3D images by recording image data period position information and other various pieces of information on a 3D image that is formed by compositing a base image and an additional image, in the image data stream as parameters. Throughout the specification, the language "record" or "recording" means "insert" or "inserting".

According to an aspect of the present invention, there is provided a method of receiving an image data stream, the method including receiving an image data stream including at least one of 2D and 3D image data periods; extracting local 3D image parameters, which are parameters of each image data period, from the image data stream; and restoring at least one of 2D and 3D images by using the local 3D image parameters, wherein each 3D image is composed of at least one of a base image and an additional image, and wherein the local 3D image parameters include stereoscopic arrangement order information representing an arrangement order of the base and additional images of the 3D image.

The method may further include extracting image data period number information representing the number of image data periods, from the image data stream, and the local 3D image parameters may include image data period position information of an image data period that is recorded in the image data stream and may also include elementary stream (ES) identification information of the image data period, if a plurality of ESs exist.

If a current image data period is a 3D image data period, the local 3D image parameters may include the stereoscopic arrangement order information.

The image data period position information may include start position information and end position information of each image data period.

The extracting of the local 3D image parameters may further include extracting ES start position information representing a start position of each ES, and the image data period position information may include image data period length information representing a length of each image data period with reference to the start position of the ES.

The local 3D image parameters may further include stereoscopic composition type information representing a method of composing the 3D image by using the base and additional images, and the stereoscopic composition type information may include at least one of a side by side format, a top and bottom format, a vertical line interleaved format, a horizontal line interleaved format, a frame sequential format, a field sequential format, a 2D left image format, and a 2D right image format.

If the stereoscopic composition type information represents the side by side format or the top and bottom format, the local 3D image parameters may further include width/height information representing widths and heights of the base and additional images.

The local 3D image parameters may further include width/height information representing widths and heights of the base and additional images.

If the image data stream is an International Standards Organization (ISO)-based media file, the local 3D image parameters may be extracted from the ISO-based media file.

The ISO-based media file may include a moov box, an mdat box, and a meta box, and the local 3D image parameters may be extracted from at least one of a sub-level box of the meta box, a sub-level box of the moov box, a sub-level box of a trak box included in the moov box, a sub-level box of the trak box, and a sub-level box of another meta box included in the trak box.

According to another aspect of the present invention, there is provided a method of generating an image data stream, the method including respectively recording 2D and 3D images in image data periods which divide an image data stream into a plurality of media data regions; and recording local 3D image parameters, which include stereoscopic arrangement order information representing an arrangement order of a base image and an additional image of each 3D image, in the image data stream, wherein each 3D image is composed of at least one of the base image and the additional image.

The local 3D image parameters may further include image data period number information representing the number of image data periods; elementary stream (ES) identification information of an image data period that is recorded in the image data stream, if a plurality of ESs exist; and image data period position information of the image data period that is recorded in the image data stream.

The local 3D image parameters may further include at least one of stereoscopic composition type information representing a method of composing the 3D image by using the base and additional images and width/height information representing widths and heights of the base and additional images, and the stereoscopic composition type information may include at least one of a side by side format, a top and bottom format, a vertical line interleaved format, a horizontal line interleaved format, a frame sequential format, a field sequential format, a 2D left image format, and a 2D right image format.

The image data period position information may include at least one of position information represented by using start and end positions of each image data period, and position information represented by using ES start position information representing a start position of each ES and image data period length information representing a length of each image data period with reference to the start position of the ES.

If the image data stream is an International Standards Organization (ISO)-based media file, the local 3D image parameters may be recorded in the ISO-based media file.

The ISO-based media file may include a moov box, an mdat box, and a meta box, and the local 3D image parameters may be recorded in at least one of a sub-level box of the meta box, a sub-level box of the moov box, a sub-level box of a trak box included in the moov box, a sub-level box of the trak box, and a sub-level box of another meta box included in the trak box.

According to another aspect of the present invention, there is provided an apparatus for receiving an image data stream, the apparatus including a reception unit for receiving an image data stream including at least one of 2D and 3D image data periods; a local 3D image parameter extraction unit for extracting local 3D image parameters, which are parameters of each image data period, from the image data stream; and an image restoration unit for restoring at least one of 2D and 3D images by using the local 3D image parameters, wherein each 3D image is composed of at least one of a base image and an additional image, and wherein the local 3D image parameters include stereoscopic arrangement order information representing an arrangement order of the base and additional images of the 3D image.

The local 3D image parameter extraction unit may further extract image data period number information representing the number of image data periods, from the image data stream, and the local 3D image parameters may include image data period position information of an image data period that is recorded in the image data stream and also include elementary stream (ES) identification information of the image data period, if a plurality of ESs exist.

The local 3D image parameters may further include at least one of stereoscopic composition type information representing a method of composing the 3D image by using the base and additional images and width/height information representing widths and heights of the base and additional images, and the stereoscopic composition type information may include at least one of a side by side format, a top and bottom format, a vertical line interleaved format, a horizontal line interleaved format, a frame sequential format, a field sequential format, a 2D left image format, and a 2D right image format.

According to another aspect of the present invention, there is provided an apparatus for generating an image data stream, the apparatus including an image data recording unit for respectively recording 2D and 3D images in image data periods which divide an image data stream into a plurality of media data regions; and a local 3D image parameter recording unit for recording local 3D image parameters, which include stereoscopic arrangement order information representing an arrangement order of a base image and an additional image of each 3D image, in the image data stream, wherein each 3D image is composed of at least one of the base image and the additional image.

The local 3D image parameters may further include image data period number information representing the number of image data periods; elementary stream (ES) identification information of an image data period that is recorded in the image data stream, if a plurality of ESs exist; and image data period position information of the image data period that is recorded in the image data stream.

The local 3D image parameters may further include at least one of stereoscopic composition type information representing a method of composing the 3D image by using the base and additional images and width/height information representing widths and heights of the base and additional images, and the stereoscopic composition type information may include at least one of a side by side format, a top and bottom format, a vertical line interleaved format, a horizontal line interleaved format, a frame sequential format, a field sequential format, a 2D left image format, and a 2D right image format.

According to another aspect of the present invention, there is provided a computer readable recording medium having recorded thereon a computer program for executing the method of receiving an image data stream.

According to another aspect of the present invention, there is provided a computer readable recording medium having recorded thereon a computer program for executing the method of generating an image data stream.

BRIEF DESCRIPTION OF THE DRAWINGS

The above and other features of the present invention will become more apparent by describing in detail exemplary embodiments thereof with reference to the attached drawings in which:

FIG. 5 is syntax illustrating local 3D image parameters according to an embodiment of the present invention;

FIG. 6A is a table illustrating stereoscopic composition type information, according to an embodiment of the present invention;

FIG. 6B is a table illustrating stereoscopic arrangement order information, according to an embodiment of the present invention;

FIG. 9 is a diagram illustrating syntax of local 3D image parameters, according to an embodiment of the present invention;

FIG. 10 is a diagram illustrating syntax of local 3D image parameters, according to another embodiment of the present invention;

FIG. 11 is a diagram illustrating syntax of local 3D image parameters, according to another embodiment of the present invention;

FIG. 12A is a diagram illustrating syntax of local 3D image parameters, according to another embodiment of the present invention;

FIG. 12B is a diagram illustrating syntax of local 3D image parameters, according to another embodiment of the present invention;

DETAILED DESCRIPTION OF THE INVENTION

Hereinafter, the present invention will be described in detail by explaining embodiments of the invention with reference to the attached drawings.

Figure 1A:
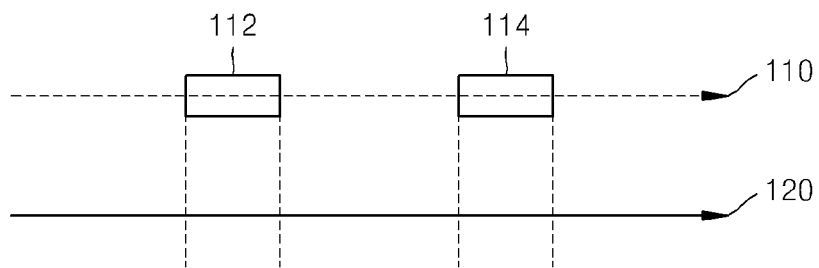
FIG. 1A is a diagram illustrating an example of a method of implementing a local three dimensional (3D) image based on a two dimensional (2D) image.
Figure 1B:
FIG. 1B is a diagram illustrating another example of a method of implementing a local 3D image based on a 2D image.
Figure 2:
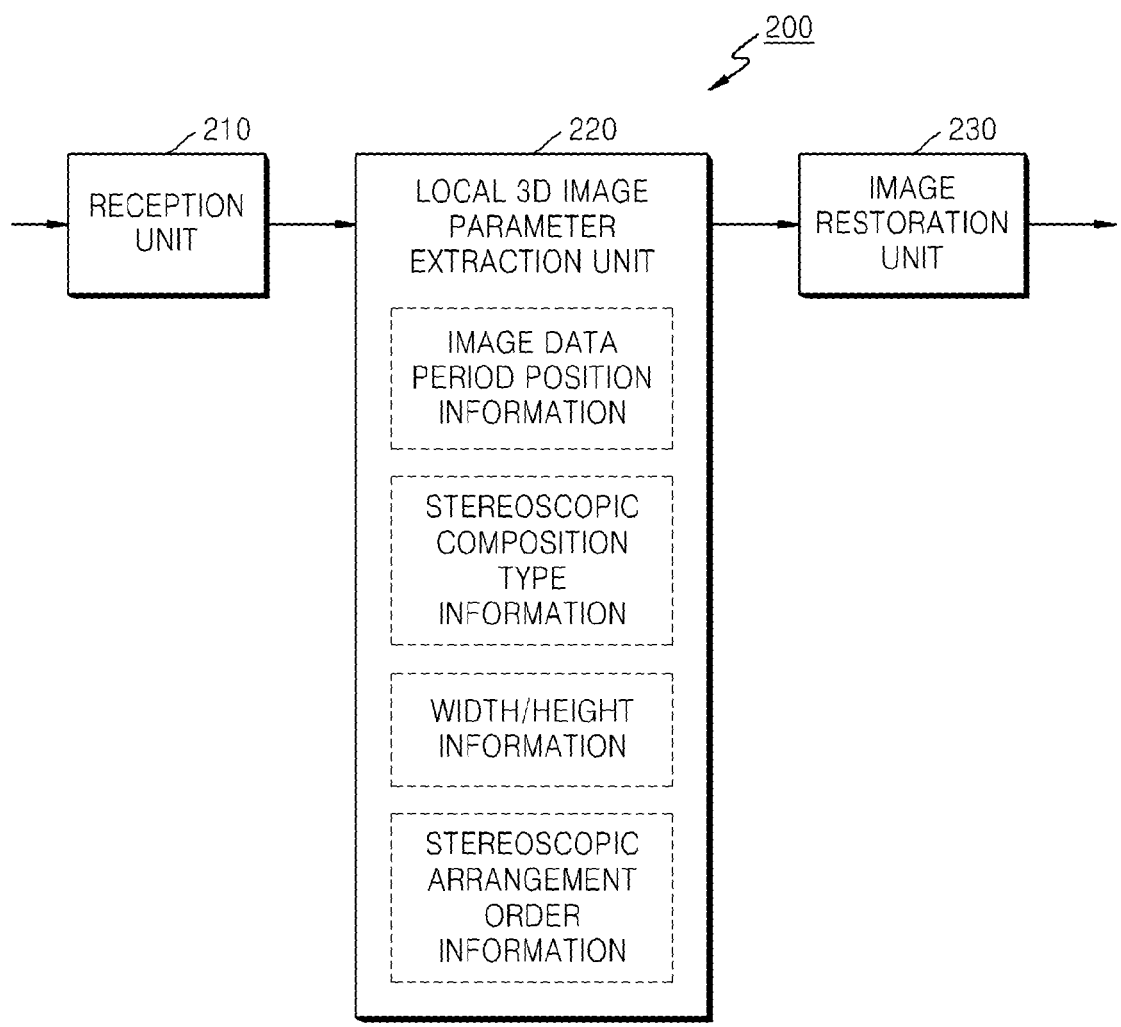
FIG. 2 is a block diagram of an apparatus for receiving an image data stream including local 3D image parameters, according to an embodiment of the present invention.

FIG. 2 is a block diagram of an apparatus 200 for receiving an image data stream including local three dimensional (3D) image parameters, according to an embodiment of the present invention.

Referring to FIG. 2, the apparatus 200 includes a reception unit 210, a local 3D image parameter extraction unit 220, and an image restoration unit 230.

The reception unit 210 receives an image data stream including two dimensional (2D) and 3D image data periods and outputs the image data stream to the local 3D image parameter extraction unit 220. At least one of two images may be composited in a 3D image. In an exemplary embodiment, the two images may be a base image and an additional image.

A 2D image is a monoscopic image obtained by using one camera, while a 3D image is a stereoscopic image obtained by using two or more cameras. For example, a left image obtained by a left camera and a right image obtained by a right camera may be composited in a 3D image. In the present invention, a base image and an additional image having a different view from the base image are composited in a 3D image.

The local 3D image parameter extraction unit 220 receives the image data stream from the reception unit 210, extracts local 3D image parameters, which are parameters of each image data period, from the image data stream, and outputs the local 3D image parameters to the image restoration unit 230. The local 3D image parameters may include stereoscopic arrangement order information representing an arrangement order of a base image and an additional image of each 3D image.

The local 3D image parameters may further include at least one of image data period position information, stereoscopic composition type information, and width/height information.

In the present invention, image data period number information representing the number of the image data periods may be extracted from the image data stream in the apparatus 200. The local 3D image parameters may include image data period position information of an image data period that is recorded in the image data stream and may also include elementary stream (ES) identification information of the image data period, if a plurality of ESs exist.

If a current image data period is a 3D image data period, the local 3D image parameters may include the stereoscopic arrangement order information.

The image data period position information may include start position information and end position information of each image data period.

The local 3D image parameter extraction unit 220 may extract ES start position information representing a start position of each ES and the image data period position information may include image data period length information representing a length of each image data period with reference to the start position of the ES.

The stereoscopic composition type information may represent a method of composing each 3D image by using a base image and an additional image.

Examples of the stereoscopic composition type information include at least one of a side by side format, a top and bottom format, a vertical line interleaved format, a horizontal line interleaved format, a frame sequential format, a field sequential format, a 2D left image format, and a 2D right image format.

The width/height information may represent widths and heights of a base image and an additional image of each 3D image. According to another embodiment of the present invention, the width/height information may be included in the local 3D image parameters only if the stereoscopic composition type information represents the side by side format or the top and bottom format.

A data stream of an International Standards Organization (ISO)-based media file includes a moov box, an mdat box, and a meta box. If the image data stream has an ISO-based media file, the local 3D image parameter extraction unit 220 may extract the local 3D image parameters from a local 3D image parameter box included in the meta box.

The local 3D image parameter extraction unit 220 may extract the ES identification information and the image data period position information from an iloc box included in the meta box and extract other parameters except for the ES identification information and the image data period position information, from the local 3D image parameter box included in the meta box.

The image restoration unit 230 may receive the local 3D image parameters from the local 3D image parameter extraction unit 220 and restore at least one of 2D and 3D images by using the local 3D image parameters.

Figure 3:
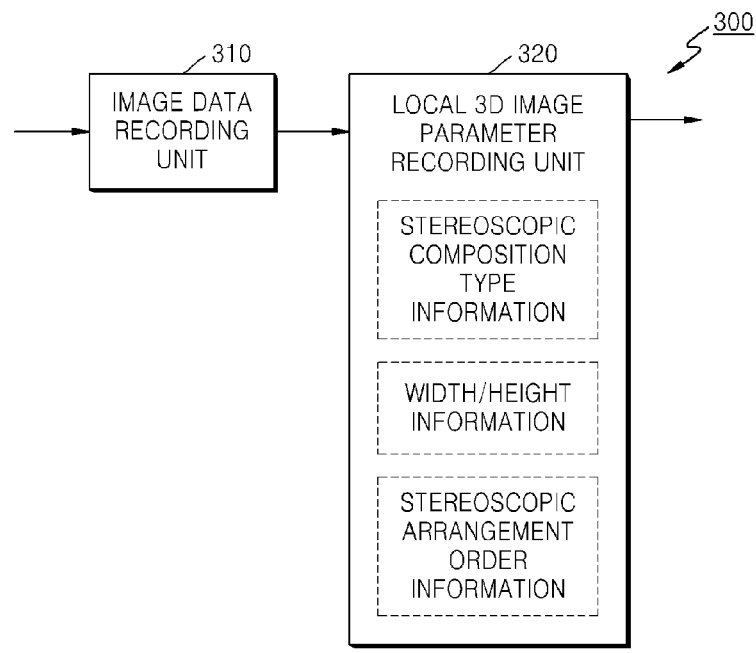
FIG. 3 is a block diagram of an apparatus for generating an image data stream including local 3D image parameters, according to an embodiment of the present invention.

FIG. 3 is a block diagram of an apparatus 300 for generating an image data stream including local 3D image parameters, according to an embodiment of the present invention.

Referring to FIG. 3, the apparatus 300 includes an image data recording unit 310 and a local 3D image parameter recording unit 320. In the present invention, an image data stream includes a plurality of media data regions which are divided by image data periods.

The image data recording unit 310 records 2D or 3D images in the image data periods and outputs an image data stream to the local 3D image parameter recording unit 320.

The local 3D image parameter recording unit 320 records local 3D image parameters, which include stereoscopic arrangement order information representing an arrangement order of a base image and an additional image of each 3D image, in the image data stream so as to output the image data stream.

The local 3D image parameters used in the apparatus 300 are the same as the local 3D image parameters used in the apparatus 200 illustrated in FIG. 2. The local 3D image parameters will now be described in detail with reference to FIGS. 4, 5, 6A, 6B, 7 through 11, 12A, and 12B.

Figure 4:
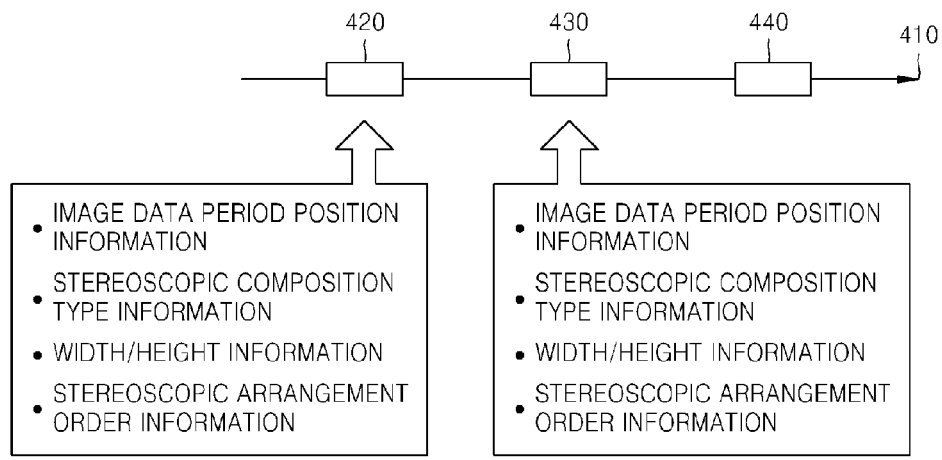
FIG. 4 is a diagram for describing a method of implementing a local 3D image, according to an embodiment of the present invention.

FIG. 4 is a diagram for describing a method of implementing a local 3D image, according to an embodiment of the present invention.

Referring to FIG. 4, an image data stream used in the apparatuses 200 and 300 respectively illustrated in FIGS. 2 and 3 is divided into a plurality of image data periods. For example, the image data stream is formed by including 3D images in 3D image data periods 420, 430, and 440 of a 2D image data-based data stream 410.

Local 3D image parameters provide detailed information on the 3D image data periods 420, 430, and 440 and include at least one of image data period position information, stereoscopic composition type information, width/height information, and stereoscopic arrangement order information.

The image data period position information represents a position of each image data period of a current image data stream.

The stereoscopic composition type information represents a method of composing each 3D image by using a base image and an additional image.

The width/height information represents widths and heights of a base image and an additional image of each 3D image.

The stereoscopic arrangement order information represents an arrangement order of a base image and an additional image of each 3D image.

In the present invention, the local 3D image parameters are defined for each of the 3D image data periods 420, 430, and 440. Thus, the image data period position information, the stereoscopic composition type information, the width/height information, and the stereoscopic arrangement order information, which may be included in the local 3D image parameters, may be separately defined for each of the 3D image data periods 420, 430, and 440. Alternatively, the image data period position information, the stereoscopic composition type information, the width/height information, and the stereoscopic arrangement order information may be defined the same for all of the 3D image data periods 420, 430, and 440.

FIG. 5 is syntax illustrating local 3D image parameters Local 3D 500 according to an embodiment of the present invention.

Referring to FIG. 5, the local 3D image parameters Local 3D 500 includes image data period number information number of interval 510 representing the number of the image data periods included in a current image data stream.

By using a for statement 520, parameters including information that may differ for each image data period are defined. In FIG. 5, image data period position information is represented by using a start position start_position 530 and an end position end position 540 of an image data period.

Stereo_file_format 550 represents stereoscopic composition type information. Composition_width 560 and composition_height 570 respectively represent width and height information. LR_First 580 represents stereoscopic arrangement order information.

According to the current embodiment, the local 3D image parameters Local3D 500 include the image data period number information number of interval 510, the image data period position information including the start position start_position 530 and the end position end position 540, the stereoscopic composition type information stereo_file_format 550, the width/height information composition_width 560 and composition_height 570, and the stereoscopic arrangement order information LR_First 580.

FIG. 6A is a table illustrating stereoscopic composition type information, according to an embodiment of the present invention.

Referring to FIG. 6A, if the stereoscopic composition type information of an image data period has a value 0, an image data of the image data period has a side by side format. For example, in the side by side format, a base image and an additional image are arranged side by side so as to form a 3D image.

If the stereoscopic composition type information of the image data period has a value 1, image data of the image data period has a top and bottom format. For example, in the top and bottom format, a base image and an additional image are respectively arranged on upper and lower sides so as to form a 3D image.

If the stereoscopic composition type information of the image data period has a value 2, image data of the image data period has a vertical line interleaved format. For example, in the vertical line interleaved format, pixel lines of a base image and an additional image are alternately arranged in a vertical direction so as to form a 3D image.

If the stereoscopic composition type information of the image data period has a value 3, image data of the image data period has a horizontal line interleaved format. For example, in the horizontal line interleaved format, pixel lines of a base image and an additional image are alternately arranged in a horizontal direction so as to form a 3D image.

If the stereoscopic composition type information of the image data period has a value 4, image data of the image data period has a frame sequential format. For example, in the frame sequential format, frames of a base image and an additional image are alternately displayed so as to form a 3D image.

If the stereoscopic composition type information of the image data period has a value 5, image data of the image data period has a field sequential format. For example, in the field sequential format, fields of a base image and an additional image are alternately displayed so as to form a 3D image. The frame sequential format and the field sequential format may be applied when two or more ESs exist.

If the stereoscopic composition type information of the image data period has a value 6, image data of the image data period has a 2D left image format. For example, in the 2D left image format, only a left image is used to form a 2D image.

If the stereoscopic composition type information of the image data period has a value 7, image data of the image data period has a 2D right image format. For example, in the 2D right image format, only a right image is used to form a 2D image.

If the stereoscopic composition type information of the image data period has one of values 8 through 255, image data of the image data period has a user private format.

FIG. 6B is a table illustrating stereoscopic arrangement order information, according to an embodiment of the present invention.

Referring to FIG. 6B, LR_First is a parameter representing stereoscopic arrangement order information of a base image and an additional image of a 3D image. According to the current embodiment, the stereoscopic arrangement order information LR_First is represented by using one bit 'u(1)'.

If the stereoscopic arrangement order information LR_First has a value 0, a left image is a base image. In this case, vertical odd lines and horizontal odd lines of the left image are respectively used in a vertical line interleaved format and a horizontal line interleaved format, the left image is respectively arranged in an upper side and a left side in a top and bottom format and a side by side format, odd fields, odd frames, and odd number of macroblocks (MBs) of the left image are respectively used in a field sequential format, a frame sequential format, and a block-interleaved format, and the left image is arranged in a main media region if two ESs exist. On the other hand, a right image is an additional image and is arranged in a region opposite to a region where the left image is arranged.

If the stereoscopic arrangement order information LR_First has a value 1, the right image is the base image. In this case, an arrangement order of the left image and the right image is opposite to a case when the stereoscopic arrangement order information LR_First has the value 0.

In the present invention, each image data period of an image data stream may have individual stereoscopic composition type information. Local 3D image parameters according to the current embodiment include the stereoscopic composition type information for each image data period. Also, the local 3D image parameters may include the stereoscopic arrangement order information LR_First corresponding to the stereoscopic composition type information. The local 3D image parameters may also include width and height information of the base image and additional image.

Figures 7, 8:
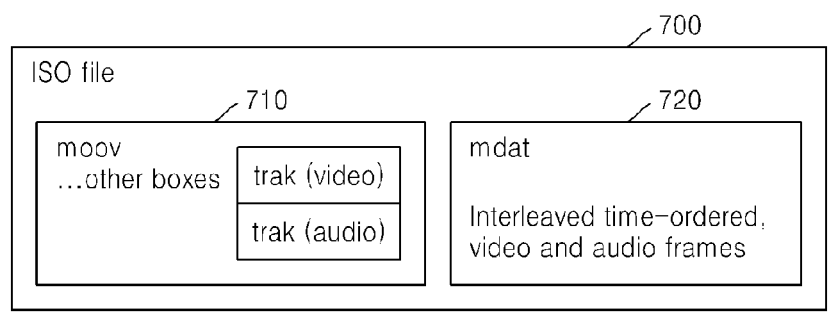
FIG. 7 is a block diagram illustrating a simple structure of an International Standards Organization (ISO)-based media file format.
FIG. 8 is a table illustrating a box list of an ISO-based media file.

FIG. 7 is a block diagram illustrating a simple structure of an ISO-based media file format.

Referring to FIG. 7, an ISO-based media file 700 includes a moov box 710 and an mdat box 720.

The moov box 710 includes basic header information on video or audio traks. The mdat box 720 includes actual video or audio data. For example, the mdat box 720 includes interleaved time-ordered video or audio frames.

FIG. 8 is a table illustrating a box list of an ISO-based media file.

Referring to FIG. 8, an ftyp box 810 represents a file type and a compatibility of the ISO-based media file and includes information on a major brand major_brand of the ISO-based media file. According to the current embodiment, the major brand major_brand is set to be 'ssav' in order to represent that the ISO-based media file is a stereoscopic image. Here, 'ssav' is an abbreviation for stereoscopic audio-video (AV).

A moov box 820 is a container for all metadata of timed resources. As described above with reference to FIG. 7, the moov box 820 includes metadata or header information on actual media data included in an mdat box 830.

The mdat box 830 is a container for the media data, as described above with reference to FIG. 7.

A meta box 840 is also a container for metadata in addition to the moov box 820. According to an embodiment of the present invention, the meta box 840 includes a sinf (stereoscopic information) box 850 as a container for local 3D image parameters.

A trak box 860 included in the moov box 820 is a container for an individual track or stream of main AV data or auxiliary data. According to another embodiment of the present invention, a sub-level box 870 of the trak box 860 may be used as the sinf box 850.

Thus, the local 3D image parameter extraction unit 220 illustrated in FIG. 2 may extract the local 3D image parameters from the sinf box 850 of the ISO-based media file. Furthermore, the local 3D image parameter recording unit 320 illustrated in FIG. 3 may record the local 3D image parameters in the sinf box 850 of the ISO-based media file.

FIG. 9 is a diagram illustrating syntax of local 3D image parameters, according to an embodiment of the present invention.

Referring to FIG. 9, the syntax corresponds to a case when the sinf box 850 is included in the meta box 840 in FIG. 8 (Box type: 'sinf'/Container: Meta box('meta')). In an ISO-based media file, local 3D image parameters are not necessarily included (Mandatory: No), and the quantity of the local 3D image parameters is 0 or 1 (Quantity: Zero or one). Definition of each parameter is the same as described above with reference to FIG. 8.

For each image data period (910), ES identification information ES_ID (920) of an image data period, image data period position information end position, and stereoscopic composition type information stereo_file_format (930) are defined. According to the current embodiment, only if the stereoscopic composition type information stereo_file_format has a value less than 6 (940), does the stereoscopic composition type information stereo_file_format of the image data period represent a 3D image format. Accordingly, the local 3D image parameters include stereoscopic arrangement order information LR_First (950). If stereoscopic composition type information stereo_file_format has a value less than 2 (960) and thus represents a side by side format or a top and bottom format, the local 3D image parameters include width/height information composition_width and composition_length (970).

FIG. 10 is a diagram illustrating syntax of local 3D image parameters, according to another embodiment of the present invention.

Referring to FIG. 10, the local 3D image parameters include start position information of ESs (1010). A plurality of ESs may have different start positions from each other and thus, if two ESs exist, two start positions base_offsetES1 and base_offsetES2 may be included.

According to the current embodiment, image data period position information is represented by using a length of an image data period with reference to the start position information of the ESs. Accordingly, for each image data period (1020), the local 3D image parameters include ES identification information ES_ID and image data period length information interval_length (1030).

In FIG. 9, a start position and an end position of each image data period are required as the image data period position information. However, in FIG. 10, by using the start position information of the ESs, image data period position information of each image data period may be represented only by the image data period length information interval_length. Accordingly, the required amount of information is reduced.

As in FIG. 9, only a 3D image (1040) includes the image data period position information (1050). Only if the 3D image has a side by side format or a top and bottom format (1060), do the local 3D image parameters include width/height information composition_width and composition_length (1070).

FIG. 11 is a diagram illustrating syntax of local 3D image parameters, according to another embodiment of the present invention.

Referring to FIG. 11, the meta box 840 illustrated in FIG. 8 includes an iloc box 1110 in order to manage metadata files. In item_ID of the iloc box 1110, ES identification information ES_ID is recorded, a start position of an image data period is represented by using base_offset and extend_offset, and a length of the image data period is represented by using extent_length. Accordingly, image data period position information is represented by using a start position of an ES and length information of the image data period.

Since the image data period position information is recorded in the iloc box 1110, a sinf box 1120 may record stereoscopic composition type information, stereoscopic arrangement order information, and width/height information as described above according to the previous embodiments.

FIG. 12A is a diagram illustrating syntax of local 3D image parameters, according to another embodiment of the present invention.

According to the previous embodiments, stereoscopic arrangement order information LR_First and width/height information composition_width and composition_height may variably exist in accordance with stereoscopic composition type information stereo_file_format. However, referring to FIG. 12A, it is assumed that most 3D images require the stereoscopic arrangement order information LR_First and the width/height information composition_width and composition_height, and therefore, all parameters are provided without a conditional statement (1210).

In the syntax illustrated in FIG. 12A, the stereoscopic composition type information stereo_file_format, the stereoscopic arrangement order information LR_First, and the width/height information composition_width and composition_height may be included in a for statement and be individually defined for each image data period.

FIG. 12B is a diagram illustrating syntax of local 3D image parameters, according to another embodiment of the present invention.

Referring to FIG. 12B, stereoscopic composition type information stereo_file_format, stereoscopic arrangement order information LR_First, and width/height information composition_width and composition_height (1220) are not included in a for statement, so as to be defined the same for all image data periods.

According to the embodiments of FIGS. 12A and 12B, the stereoscopic composition type information stereo_file_format, the stereoscopic arrangement order information LR_First, and the width/height information composition_width and composition_height may be individually defined for each image data period or be defined the same for all image data periods. However, the present invention is not limited thereto.

For example, the stereoscopic composition type information stereo_file_format may be defined the same for all image data periods, while the stereoscopic arrangement order information LR_First, and the width/height information composition_width and composition_height may be individually defined for each image data period. Alternatively, the stereoscopic composition type information stereo_file_format and the stereoscopic arrangement order information LR_First may be individually defined for each image data period, while the width/height information composition_width and composition_height may be defined the same for all image data periods.

Figure 13:
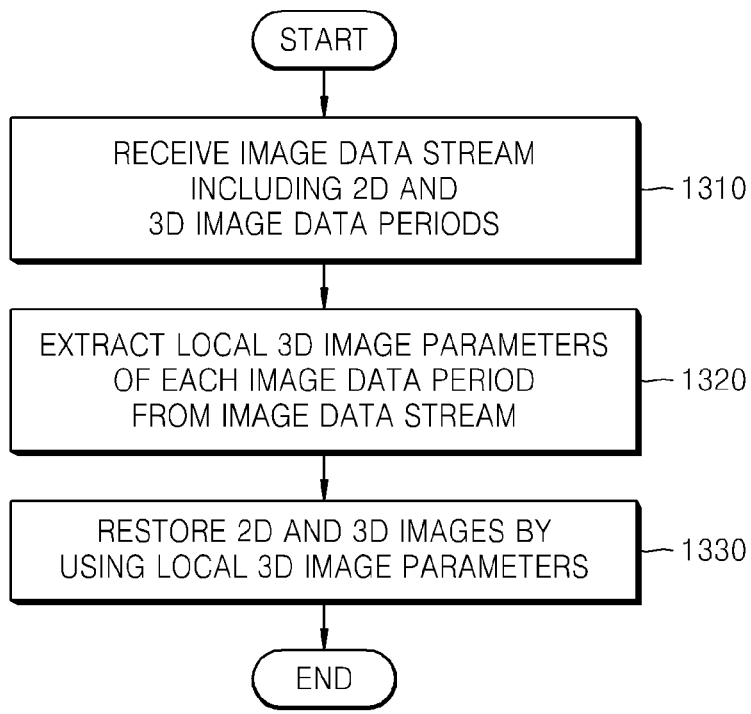
FIG. 13 is a flowchart of a method of receiving an image data stream including local 3D image parameters, according to an embodiment of the present invention.

FIG. 13 is a flowchart of a method of receiving an image data stream including local 3D image parameters, according to an embodiment of the present invention.

Referring to FIG. 13, an image data stream including image data periods is received in operation 1310.

Local 3D image parameters, which are parameters of each image data period, are extracted from the image data stream in operation 1320. Here, the local 3D image parameters include stereoscopic arrangement order information representing an arrangement order of a base image and an additional image of each 3D image.

The local 3D image parameters may include at least one of image data period position information, stereoscopic composition type information, width/height information, and the stereoscopic arrangement order information.

If the image data stream is an ISO-based media file, the local 3D image parameters may be extracted from the ISO-based media file.

The ISO-based media file may include a moov box, an mdat box, and a meta box. The local 3D image parameters may be extracted from at least one of a sub-level box of the meta box, a sub-level box of the moov box, a sub-level box of a trak box included in the moov box, a sub-level box of the trak box, and a sub-level box of another meta box included in the trak box.

At least one of a 2D image and a 3D image is restored by using the local 3D image parameters in operation 1330.

Figure 14:
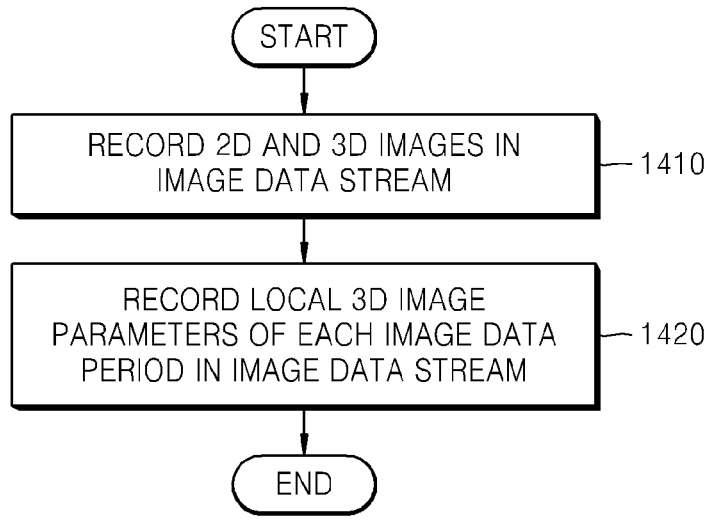
FIG. 14 is a flowchart of a method of generating an image data stream including local 3D image parameters, according to an embodiment of the present invention.

FIG. 14 is a flowchart of a method of generating an image data stream including local 3D image parameters, according to an embodiment of the present invention.

Referring to FIG. 14, 2D and 3D images are respectively recorded in image data periods which divide an image data stream into a plurality of media data regions in operation 1410.

Local 3D image parameters, which include stereoscopic arrangement order information representing an arrangement order of a base image and an additional image of each 3D image, are recorded in the image data stream in operation 1420.

The local 3D image parameters may include at least one of image data period position information, stereoscopic composition type information, width/height information, and the stereoscopic arrangement order information.

If the image data stream is an ISO-based media file, the local 3D image parameters may be recorded in the ISO-based media file.

The ISO-based media file may include a moov box, an mdat box, and a meta box. The local 3D image parameters may be recorded in at least one of a sub-level box of the meta box, a sub-level box of the moov box, a sub-level box of a trak box included in the moov box, a sub-level box of the trak box, and a sub-level box of another meta box included in the trak box.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). In an exemplary embodiment, the computer readable recording medium may include storage media such as carrier waves (e.g., transmission through the Internet).

As described above, according to the present invention, a local 3D image may be accurately and efficiently displayed from a received image data stream including 2D and 3D images by extracting image data period position information and other various pieces of information such as stereoscopic composition type information, width/height information, 3D arrangement method information on a 3D image that is formed by compositing a base image and an additional image.

Also, an image data stream including 2D and 3D images may be generated by recording image data period position information and other various pieces of information such as stereoscopic composition type information, width/height information, 3D arrangement method information on a 3D image that is formed by compositing a base image and an additional image, in the image data stream as parameters.

By providing stereoscopic arrangement order information of a base image and an additional image included in a 3D image, an image mismatch caused by arranging the base and additional images in a wrong order may be prevented.

Furthermore, parameters such as image data period position information, stereoscopic composition type information, width/height information, and stereoscopic arrangement order information may be individually defined, and thus an image may be adaptively and accurately represented or restored in accordance with characteristics of each image data period.

By compositing 3D image data in partial periods of a 2D image data, the 3D image data may be displayed to users by three dimensionally displaying the 3D image data in the partial periods.

Since visual fatigue may be caused while viewing 3D images for a long time, by viewing the 3D images only in particular periods, viewers may concentrate easier and difficulties of producing or preparing a large amount of 3D images may be solved. Thus, it is expected that 3D images may become popular. The present invention may be applied to various multimedia devices such as digital televisions (DTVs), personal computer (PC) monitors, and camcorders.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of receiving an image data stream, the method comprising:
    receiving an image data stream comprising at least one image data period;
    extracting at least one local 3D image parameter of each of the at least one image data period, from the image data stream;
    extracting image data of the each of the at least one image data period, from the image data stream, wherein the extracted image data of the each of the at least one image data period is one of a partial data period of a 2D image and a partial data period of a 3D image; and
    restoring at least one of the 2D image and the 3D image for the image data stream by using the at least one local 3D image parameter and the extracted image data of the each of the at least one image data period,
    wherein the 3D image is composed of a pair of a first image and a second image according to a stereoscopic composition type information representing a method of arranging the pair of the first image and the second image to format the 3D image, and
    wherein the at least one local 3D image parameter comprises stereoscopic arrangement order information indicating an arrangement order of each of the pair of the first and the second images according to the stereoscopic composition type information of the 3D image.

2. The method of claim 1, further comprising extracting image data period number information indicating a number of image data periods, from the image data stream,
    wherein the at least one local 3D image parameter comprises image data period position information of the at least one image data period and an elementary stream (ES) identification information of the at least one image data period, if a plurality of ESs exist.

3. The method of claim 1, wherein the first image is a base view image and the second image is an additional view image.

4. The method of claim 2, wherein the image data period position information comprises start position information and end position information of each of the at least one image data period.

5. The method of claim 2, wherein the extracting of the at least one local 3D image parameter further comprises extracting ES start position information indicating a start position of an ES, and
    wherein the image data period position information comprises image data period length information indicating a length of the at least one image data period with reference to the start position of the ES.

6. The method of claim 1, wherein the at least one local 3D image parameter further comprises the stereoscopic composition type information, and
    wherein the stereoscopic composition type information comprises at least one of a side by side format, a top and bottom format, a vertical line interleaved format, a horizontal line interleaved format, a frame sequential format, a field sequential format, a 2D left image format, and a 2D right image format.

7. The method of claim 6, wherein, if the stereoscopic composition type information indicates the side by side format or the top and bottom format, the at least one local 3D image parameter further comprises width/height information indicating widths and heights of the first and the second images.

8. The method of claim 1, wherein the at least one local 3D image parameter further comprises width/height information indicating widths and heights of the first and the second images.

9. The method of claim 1, wherein, if the image data stream is an International Standards Organization (ISO)-based media file, the at least one local 3D image parameter is extracted from the ISO-based media file.

10. The method of claim 9, wherein the ISO-based media file comprises a moov box, an mdat box, and a meta box, and
    wherein the at least one local 3D image parameter is extracted from at least one of a sub-level box of the meta box, a sub-level box of the moov box, a sub-level box of a trak box included in the moov box, a sub-level box of the trak box, and a sub-level box of another meta box included in the trak box.

11. A method of generating an image data stream, the method comprising:
    including, by a processor for generating an image data stream, one of a partial period of a two dimensional (2D)

image and a partial period of a three dimensional (3D) image in each of at least one image data period of the image data stream;

including, by the processor, at least one local 3D image parameter of the each of at least one image data period, in the image data stream; and outputting the image data stream including at least one of the 2D image and the 3D image, wherein the at least one local 3D image parameter and image data of the each of the at least one image data period are used to restore at least one of 2D image and the 3D image from the image data stream, wherein the 3D image is composed of a pair of a first image and a second image according to a stereoscopic composition type information representing a method of arranging the pair of the first image and the second image to format the 3D image, and wherein the at least one local 3D image parameter comprises stereoscopic arrangement order information indicating an arrangement order of each of the pair of the first image and the second image according to the stereoscopic composition type information of the 3D image.

12. The method of claim 11, wherein the local 3D image parameter further comprises:

image data period number information indicating a number of image data periods;

elementary stream (ES) identification information regarding the each of at least one image data period, if a plurality of ESs exist; and image data period position information regarding the each of at least one image data periods.

13. The method of claim 11, wherein the local 3D image parameter further comprises at least one of the stereoscopic composition type information and width/height information indicating widths and heights of the first and the second images, and wherein the stereoscopic composition type information comprises at least one of a side by side format, a top and bottom format, a vertical line interleaved format, a horizontal line interleaved format, a frame sequential format, a field sequential format, a 2D left image format, and a 2D right image format.

14. The method of claim 12, wherein the image data period position information comprises at least one of position information indicating a start position and an end position of the one of the two image data periods, and position information represented by using ES start position information indicating a start position of an ES and image data period length information indicating a length of one of the two image data periods with reference to the start position of the ES.

15. The method of claim 11, wherein, if the image data stream is an International Standards Organization (ISO)-based media file, the local 3D image parameter is recorded in the ISO-based media file.

16. The method of claim 15, wherein the ISO-based media file comprises a moov box, an mdat box, and a meta box, and wherein the local 3D image parameter is included in at least one of a sub-level box of the meta box, a sub-level box of the moov box, a sub-level box of a trak box included in the moov box, a sub-level box of the trak box, and a sub-level box of another meta box included in the trak box.

17. An apparatus for receiving an image data stream, the apparatus comprising:

a reception unit which receives an image data stream comprising at least one image data period;

a local 3D image parameter extraction unit which extracts a local 3D image parameter of each of the at least one image data period, from the image data stream, and extracts image data of the each of the at least one image data period, from the image data stream, wherein the extracted image data of the each of the at least one image data period is one of a partial data period of a 2D image and a partial data period of a 3D image; and an image restoration unit which restores at least one of the 2D image and the 3D image for the image data stream by using the local 3D image parameter and the extracted image data of the each of the at least one image data period, wherein the 3D image is composed of a pair a first image and a second image according to a stereoscopic composition type information representing a method of arranging the pair of the first image and the second image to format the 3D image, and wherein the local 3D image parameter comprises stereoscopic arrangement order information indicating an arrangement order of each of the pair of the first and the second images according to the stereoscopic composition type information of the 3D image.

18. The apparatus of claim 17, wherein the local 3D image parameter extraction unit further extracts image data period number information indicating the number of the image data periods, from the image data stream, and wherein the local 3D image parameter comprises image data period position information of the at least one image data period and elementary stream (ES) identification information of the at least one image data period, if a plurality of ESs exist.

19. The apparatus of claim 18, wherein the image data period position information comprises at least one of position information indicating a start position and an end position of the at least one image data period; and position information represented by using ES start position information indicating a start position of an ES and image data period length information indicating a length of the at least one image data period with reference to the start position of the ES.

20. The apparatus of claim 17, wherein the local 3D image parameter further comprises at least one of the stereoscopic composition type information and width/height information indicating widths and heights of the first and the second images, and wherein the stereoscopic composition type information comprises at least one of a side by side format, a top and bottom format, a vertical line interleaved format, a horizontal line interleaved format, a frame sequential format, a field sequential format, a 2D left image format, and a 2D right image format.

21. The apparatus of claim 17, wherein, if the image data stream is an International Standards Organization (ISO)-based media file, the local 3D image parameter is extracted from the ISO-based media file.

22. The apparatus of claim 21, wherein the ISO-based media file comprises a moov box, an mdat box, and a meta box, and wherein the local 3D image parameter is extracted from at least one of a sub-level box of the meta box, a sub-level box of the moov box, a sub-level box of a trak box included in the moov box, a sub-level box of the trak box, and a sub-level box of another meta box included in the trak box.

23. An apparatus for generating an image data stream, the apparatus comprising:

an image data recording unit which records one of a partial period of a two dimensional (2D) image and a partial period of a three dimensional (3D) image in each of at least one image data period of an image data stream;

a parameter recording unit which records at least one local 3D image parameter of the each of at least one image data period in the image stream; and an output unit which outputs the image data stream including at least one of the 2D image and the 3D image, wherein the at least one local 3D image parameter and image data of the each of the at least one image data period are used to restore at least one of 2D image and the 3D image from the image data stream, wherein the 3D image is composed of a pair of a first image and a second image according to a stereoscopic composition type information representing a method of arranging the pair of the first image and the second image to format the 3D image, and wherein the at least one local 3D image parameter comprising stereoscopic arrangement order information indicating an arrangement order of each of the pair of the first image and the second image of the 3D image according to the stereoscopic composition type information of the 3D image.

24. The apparatus of claim 23, wherein the local 3D image parameter further comprises:

image data period number information which indicates a number of image data periods;

elementary stream (ES) identification information regarding the each of the at least one image data period, if a plurality of ESs exist; and image data period position information regarding the each of the at least one image data period.

25. The apparatus of claim 23, wherein the local 3D image parameter further comprises at least one of the stereoscopic composition type information and width/height information indicating widths and heights of the first and the second images, and wherein the stereoscopic composition type information comprises at least one of a side by side format, a top and bottom format, a vertical line interleaved format, a horizontal line interleaved format, a frame sequential format, a field sequential format, a 2D left image format, and a 2D right image format.

26. The apparatus of claim 24, wherein the image data period position information comprises at least one of position information represented by using a start position and an end position of the each of at least one image data period corresponding to the local 3D image parameter, and position information represented by using ES start position information indicating a start position of the ES and image data period length information indicating a length of the each of at least one image data period corresponding to the local 3D image parameter, with reference to the start position of the ES.

27. The apparatus of claim 23, wherein, if the image data stream is an International Standards Organization (ISO)-based media file, the local 3D image parameter is included in the ISO-based media file.

28. The apparatus of claim 27, wherein the ISO-based media file comprises a moov box, an mdat box, and a meta box, and wherein the local 3D image parameter is included in at least one of a sub-level box of the meta box, a sub-level box of the moov box, a sub-level box of a trak box included in the moov box, a sub-level box of the trak box, and a sub-level box of another meta box included in the trak box.

29. A non-transitory computer readable recording medium having recorded thereon a computer program for executing the method of claim 1.

30. A non-transitory computer readable recording medium having recorded thereon a computer program for executing the method of claim 11.

* * * * *